June 17, 1930.  J. G. JACKSON  1,763,969
ELECTRIC DRY CELL
Filed Jan. 15, 1927
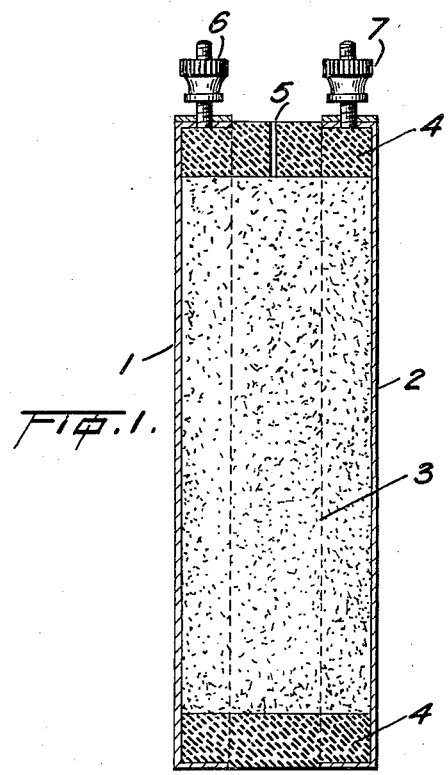
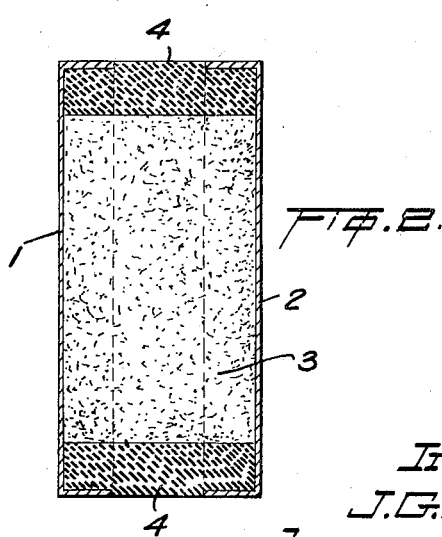
Inventor.
J. G. Jackson Patented June 17, 1930

1,763,969

UNITED STATES PATENT OFFICE

JOHN GRANT JACKSON, OF CHATHAM, ONTARIO, CANADA

ELECTRIC DRY CELL

Application filed January 15, 1927. Serial No. 161,373.

My invention relates to improvements in electric dry cells and the object of the invention is to devise a type of dry cell which is capable of developing its full characteristic electromotive force without deterioration for longer periods than is the case in the ordinary form of dry cell.

A further object is to construct a dry cell in which a depolarizer or its equivalent is unnecessary, and a still further object is to devise such a cell in which the electrodes thereof when used to enclose the cell will not be subject to disintegration by the electro chemical action within the cell when in use.

Yet another object is to devise a dry cell which shall be capable of being energized by an electric current impressed thereon.

My invention consists of a dry cell of which the form depicted in the drawing is a typical example. In the drawings:—

Fig. 1 is a vertical cross section, and
Fig. 2 is a horizontal cross section.

Like characters of reference indicate corresponding parts in the different views.

1 is one electrode, preferably of sheet iron, and forming part of the wall of the cell. 2 is the other electrode also preferably formed of sheet iron and so disposed as to form part of the wall of the cell. 3 is an absorbent medium which is not conducting except as an electrolyte for absorbing the liquid electrolyte employed. 4 is an insulating wax or other seal for sealing the electrolyte into the cell and forming part of the wall thereof. 5 is a vent hole through the seal 4 for venting any excess gases which may be formed within the cell. 6 is the terminal of one electrode 1 and 7 the terminal of the other electrode.

Where it is desired to assemble a number of cells of the form illustrated in series to form a multicell dry battery the electrodes may be common to adjacent cells, the positive plate surface of one cell being formed upon the other side of the electrode upon which the adjacent negative plate surface of the next cell is formed.

In place of the absorbent medium impregnated with a liquid electrolyte, a jellified or other semi-solid electrolyte may be used. The electrolyte in either case would be preferably an approximately twenty percent solution of caustic soda or caustic potash where the electrodes are of iron.

Also while I have described the electrodes as being composed of iron they may be made of any other suitable materials in their corresponding electrolytes.

A dry cell of which the form described is an example is designed to be energized solely by the reactive effect produced within the cell when acted upon by an impressed electric current derived from any source of current supply to which the cell terminals may be connected.

Such reactive electromotive force is generated in my cell by the gas products of decomposition of the electrolyte when deposited upon the electrode surfaces upon the passage of the said impressed electric current therethrough. In other words the reactive electromotive force developed in my cell is the counter electromotive force of what is ordinarily termed polarization and which in the usual form of dry cell acts with a detrimental effect by reducing the effective electromotive force. Obviously in my cell this counter electromotive force is usefully employed.

The polarity of the electrodes of this cell when used as described above will be interchangeably positive or negative but will be such as to oppose the flow of current from any supply source to which the cell may be connected.

Moreover, a cell of this type employing electrodes in the form of plain iron will have a relatively small energy storing capacity but is capable of being employed usefully to maintain a constant electromotive force for various purposes for which this may be required. When greater energy storage capacity is desired electrodes of much larger effective surface area may be used either by providing such electrodes with corrugated or spicular surfaces or by constructing them of porous conducting materials.

What I claim as my invention is:

An electric dry cell comprising positive and negative electrodes, each of said electrodes forming one side wall, insulation spacing said electrodes and forming the bottom and end walls, and an absorbent material contained within the cell.

JOHN GRANT JACKSON.